Nov. 20, 1956 C. C. SIGLE 2,771,106
WOOD SHAPING MACHINE
Filed July 19, 1955 3 Sheets-Sheet 1

INVENTOR
Clarence C. Sigle
BY
George A. Tew
ATTORNEY

Nov. 20, 1956

C. C. SIGLE 2,771,106

WOOD SHAPING MACHINE

Filed July 19, 1955

INVENTOR
Clarence C. Sigle

BY
George A. Tew
ATTORNEY

Nov. 20, 1956 C. C. SIGLE 2,771,106
WOOD SHAPING MACHINE
Filed July 19, 1955 3 Sheets-Sheet 3
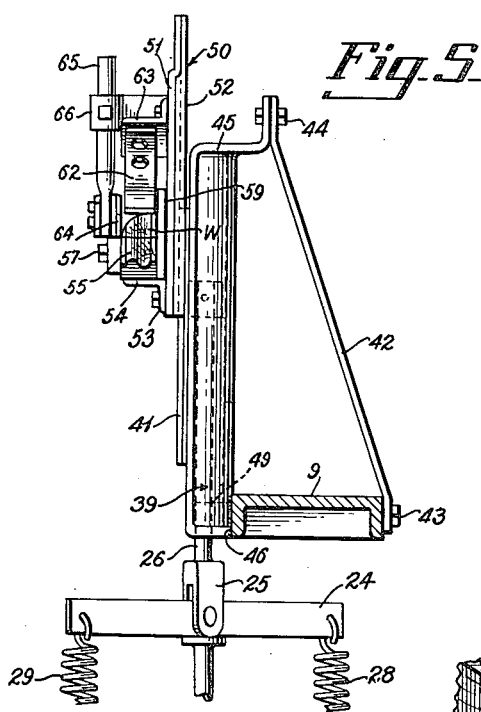
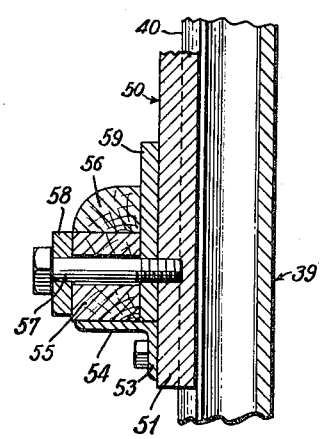
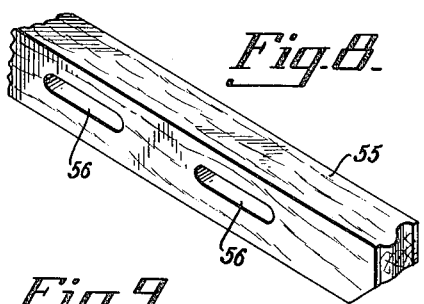
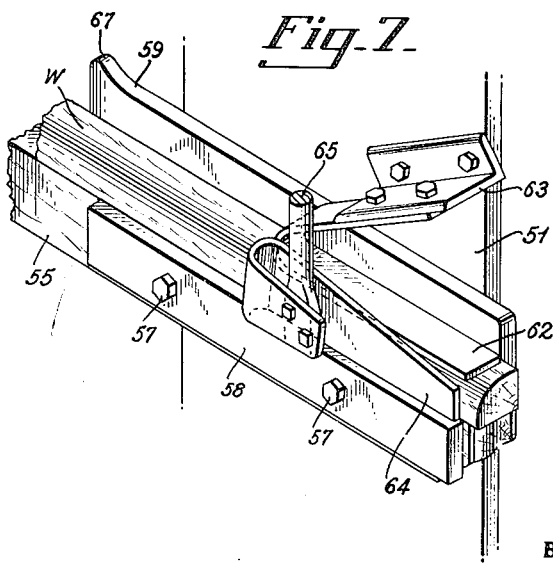
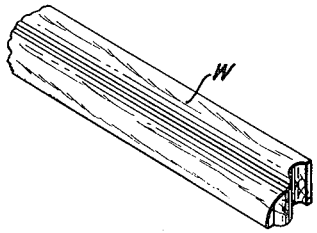
INVENTOR
Clarence C. Sigle
BY
ATTORNEY United States Patent Office 2,771,106
Patented Nov. 20, 1956

2,771,106

WOOD SHAPING MACHINE

Clarence C. Sigle, Waldo, Ark., assignor of one-half to William H. Boswell, Waldo, Ark.

Application July 19, 1955, Serial No. 522,978

6 Claims. (Cl. 144—134)

This invention relates to a shaping machine and more particularly to a wood shaping machine.

One of the main objects of the invention is to provide a machine for shaping the ends of mouldings or other relatively long woodworking pieces in which it is desired to have the end of the same provided with a particular configuration.

The main object of the invention is to provide a wood shaping machine, more particularly for shaping the ends of a piece of moulding as by a rotary pattern cutter, the machine incorporating a backing-up bar upon which the moulding is fixed whereby upon completion of the cut the wood of the moulding will not be splintered or frayed, which would be the case in the event that such a pattern cut were taken on a piece of moulding without such a novel backing-up bar.

A further object of the invention is to provide a fixed rotary pattern cutter in position whereby the backing-up bar and moulding are moved past the rotating fixed pattern cutter for completing the cutting operation and thereafter returned to its normal starting position.

A further object of the invention is to provide the backing-up bar with elongated slots whereby when the front edge portion thereof becomes worn the same can be recut to produce a new surface for the cutting of the moulding ends.

To applicant's knowledge there has never been a machine of this type for cutting the patterned end of a moulding strip and this has mainly been due to the fact that heretofore the moulding was not properly backed up and therefore during the cutting operation the end of the moulding was splintered, which, of course, was undesirable and made a defective cut. Applicant has overcome this defect by his novel backing-up plate in the manner in which the work is moved past the rotary pattern cutter.

The invention is illustrated in the accompanying drawings in which:

Fig. 5 is a section on the line 5—5 of Fig. 3;

Fig. 6 is a section on the line 6—6 of Fig. 3;

Fig. 7 is an enlarged and detailed view of the forward portion of the backing-up bar and the spring means for holding the moulding in position therewith;

Fig. 8 is an enlarged view of the front portion of the backing-up bar; and

Fig. 9 is an enlarged view of the moulding with its finished cut.

Figure 1:
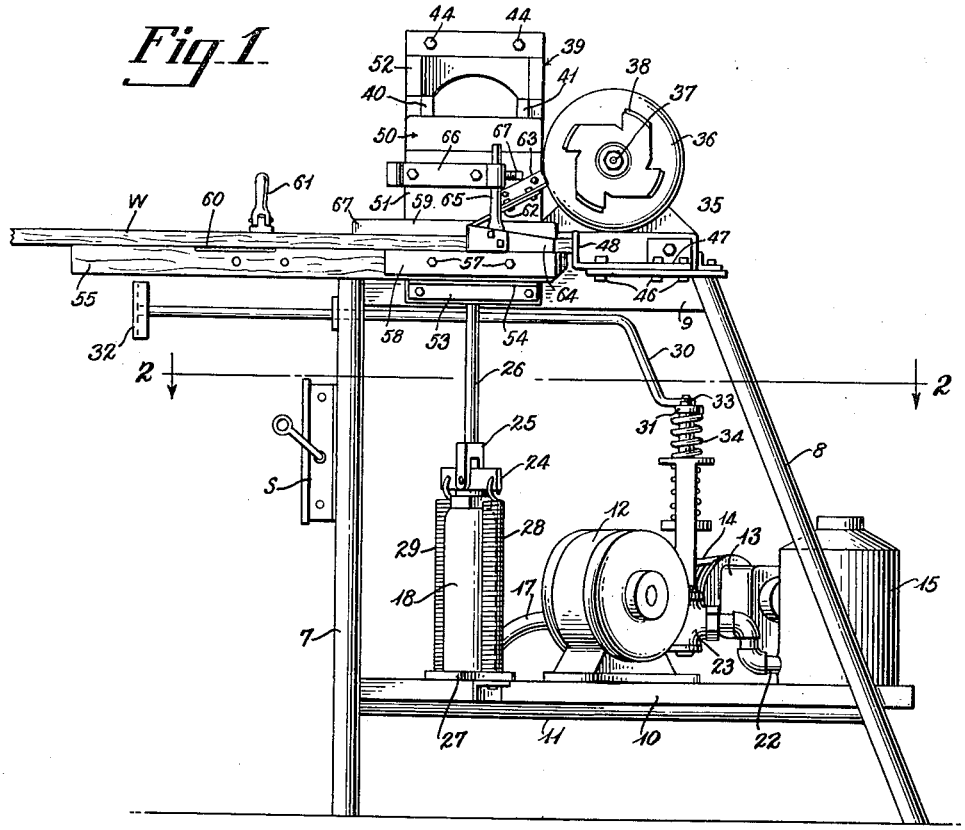
Fig. 1 is a view in side elevation of the machine.
Figure 2:
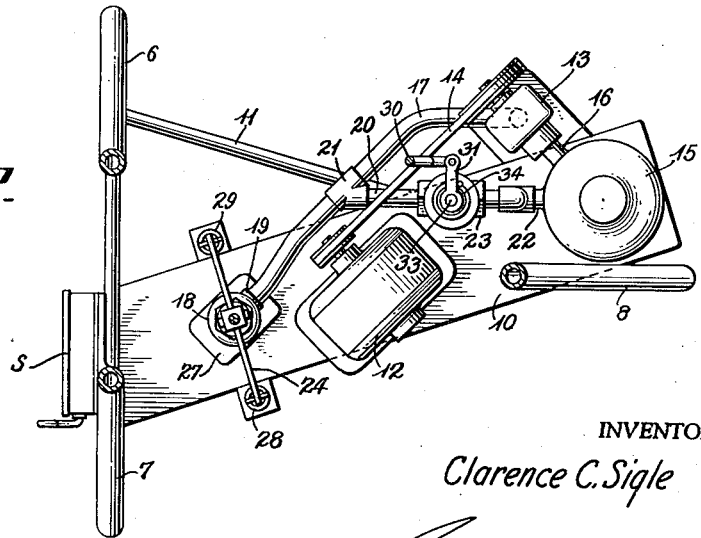
Fig. 2 is a section on the line 2—2 of Fig. 1.

In the drawings in which like numerals are used to indicate similar parts throughout the various views, the machine basically includes a pair of rear legs 6 and 7 which are angled outwardly towards their lower ends to provide a better support and further having a front leg 8 which slopes forwardly, said legs being rigidly attached as by welding or the like to an upper bed 9 of the machine. This upper bed 9 carries the upper working parts of the machine which will be described in detail as the description proceeds.

The machine is further provided below the bed 9 with a platform 10 which is securely supported by the respective leg portions, one side of the platform being welded to the legs 7 and 8 and the other side of the platform being supported as by bracket 11 extending from the platform to the leg 6.

The platform 10 carries the hydraulic mechanism for moving the work past the cutter and includes an electric motor 12 which drives a pump 13 as by belt 14. A reservoir 15 is supported in association with the pump 13, said reservoir containing a hydraulic fluid such as oil or the like. The pump is connected to the oil reservoir 15 as by an outlet pipe 16 and further is connected to a pipe 17 which is capable of directing fluid to a ram cylinder 18 as by a connection 19. A branch pipe 20 is connected to the delivery pipe 17 as by a collar 21, said pipe 20 being connected to the reservoir as at 22, the pipe 20 being provided between the reservoir and the pipe 17 with a valve generally indicated at 23, said valve being capable of operation to block the return of fluid through the line 20 to the reservoir in one position and in its other position to allow return fluid to pass through the pipe 20 back to the reservoir 15. The ram 18 is provided with the usual pistol which is connected to a crosshead 24, the latter, as by yoke 25 being connected to an operating rod 26, said rod being connected to the work carrier, later to be described for raising the same. The ram is mounted on a plate 27 supported by the platform 10 and the crosshead 24 has attached thereto at opposite ends springs 28 and 29, said springs at their lower ends being anchored to the plate 27.

The valve 23 is connected to an operating rod 30, said rod being affixed at one end to a link 31 affixed to the valve, while the other end of the operating rod 30 is provided with an enlarged head 32 which is capable of manual operation, as by the knee of a workman, to move the valve to its closed position. The link 31 is connected to a valve stem 33, the valve stem 33 having a coil spring 34 wound therearound and the upper free end thereof engaging the link 31 to return the operating lever to its normal inoperative position whenever the workman releases pressure on the enlarged portion 32.

Figure 3:
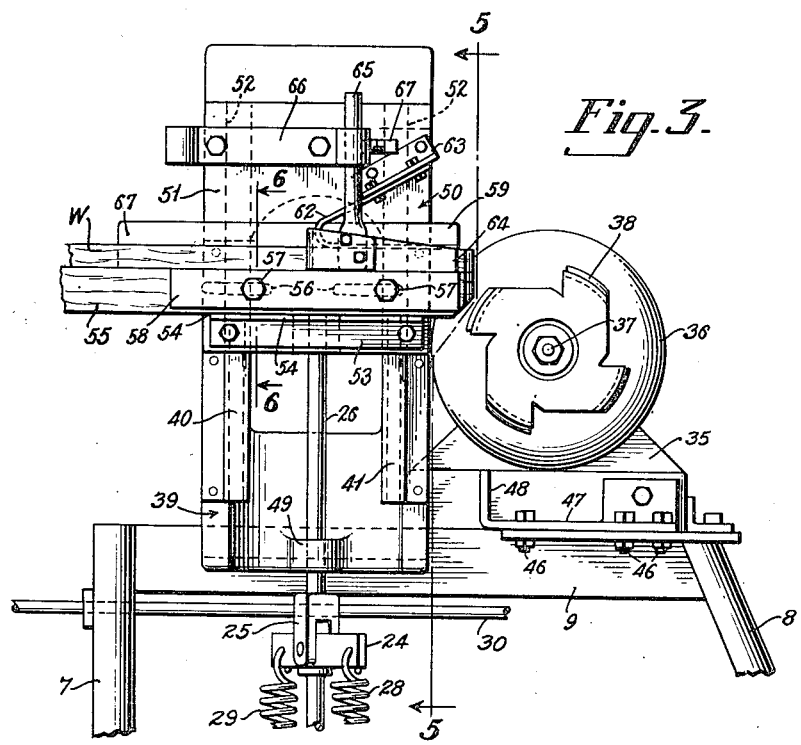
Fig. 3 is an enlarged view in side elevation of the backing-up bar and its carrier shown after the work has been moved upwardly past the cutter.
Figure 4:
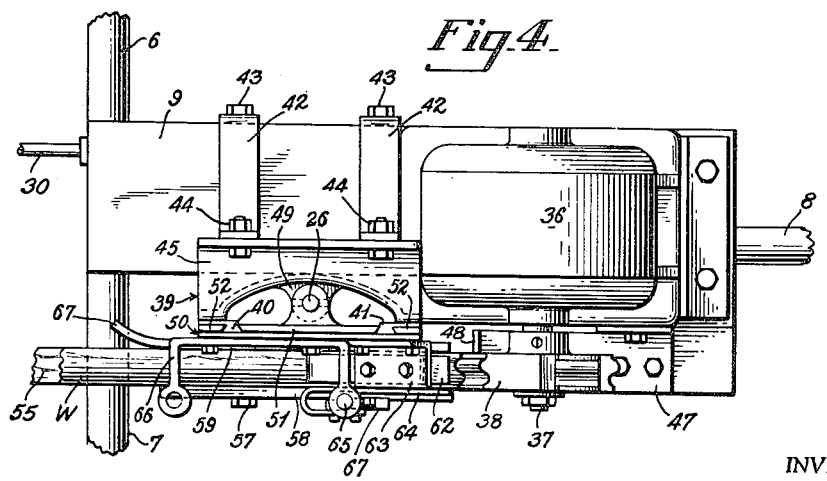
Fig. 4 is a top plan view of the machine illustrating the upper portion thereof.

The upper bed of the machine has affixed thereto along its front portion a motor supporting bracket 35 (Fig. 3), said bracket supporting the electric motor 36, said motor having a driven shaft 37 on which is mounted a rotary pattern cutter 38, that is a suitable cutter for producing the desired design required on the end of a piece of work. The motor is mounted in proximity to a work supporting bracket 39, and as seen in Fig. 5 the bracket is preferably welded to the machine bed 9 along its lower edge, said bracket having along opposite sides thereof fixed precision guide plates 40 and 41 (Figs. 1 and 4). The bed 9 includes a pair of brackets, one of which is shown at 42 (Fig. 5), which are bolted at their bottom ends to the bed 9 as at 43 and at their upper ends are bolted as at 44 to a bracket 45, which brackets 45 extend substantially around the carrier 39 and are welded as at 46 to the bed 9, such construction providing further support for the carrier head 39. The bed 9 has attached thereto as by a plurality of bolts and nuts 46' (Fig. 1), a stop member 47, said stop member including an upturned end potrion 48 capable of stopping the backing-up bar 55 and work when the machine is in its lowered position. The carrier head, midway at its lower portion, includes a guide bushing 49 through which the rod 26 moves up and down during the time that the work supporting head is moved up and down.

The work supporting head generally indicated at 50 comprises a metal plate 51 having mounted thereon guide tracks 52 (Figs. 1, 3 and 4), said tracks being of dovetail configuration and engaging the precision guides 40 and 41. The plate 51 has bolted thereto along its lower edge an angle iron 53 having a forwardly extending angle 54 (Fig. 5). This angle iron is capable of supporting the backing-up bar 55, said backing bar being provided with longitudinal slots 56 (Fig. 8), which slots 56 having bolts 57 which extend through a front plate 58 and a rear plate 59, said bolts 57 being further secured into recesses within the plate 51 (Fig. 6), said bolts in combination with the plate 58 holding the backing-up bar 55 in adjusted relation, said bar 55 being capable of longitudinal adjustment as by the slots 56. Such adjustment is highly important in view of the fact that from time to time the contoured end of the backing-up bar will become worn and consequently will have to be recut to produce a new finished surface and when such a condition occurs the bolts 57 are released and the backing-up bar moved forwardly sufficiently to have a new cut made thereon as by the rotary pattern cutter 38. The backing-up bar 55 is provided adjacent the rear portion thereof with a serrated metal plate 60 (Fig. 1) and further provided with a well known hand clamp 61, said clamp 61 being attached to the backing-up bar 55 as by screws or bolts. The moulding or work as indicated at W (Fig. 9), at its forward end is engaged by leaf springs, the top leaf spring 62 being attached to the plate 51 as by a metal bracket 63, while the side leaf spring 64 is attached to a vertically extending rod 65 which is capable of adjustment in a holder 66 (Fig. 5) as by a set screw 67. Of course these springs operate to hold the work piece in relatively fixed position with respect to the end of the backing-up bar 55. As will be seen from Fig. 7, the plate 59 is provided with a flared entrance end 68 (Figs. 4 and 7).

The machine operates in the following manner. It will be observed that the work carrying plate 51 with its dovetail precision guiding surfaces which cooperate with the guide surfaces 40, 41 of the carrier 39 permits the vertical movement of the work carrier 51 and its associated parts past the fixed pattern cutter 38. In the first instance the carrier 51 is moved to its lower position whereupon the backing up bar 55 is mounted within the support 54 provided therefor, and in this position, with no work piece mounted thereon the work carrying head is moved upwardly past the rotary cutter, it being observed that the rotary cutter is positioned within the path of the moving backing up bar. The backing up bar is made of a relatively hard compressed wood and is beveled backwardly on its under front side and as the work carrier moves upwardly the backing up bar is moved past the cutter whereby the cutter cuts the desired configuration in the backing up bar. In the present invention the particular cut is illustrated as an S cut, but of course it will be readily recognized that any shape desired could be produced by using any desired pattern cutter. After this has been accomplished the work carrier is lowered whereupon the work to be cut is moved into position wherein its end extends slightly past the contoured end of the backing up bar. It will be noted that in this position the work is held first by the leaf springs 62 and 64 (Fig. 7) in close proximity to the upper surface of the backing up bar. This is important to prevent "play" in the work as the latter is moved past the rotary cutter. When the work is thus positioned upon the backing up bar 55, the workman manipulates the handle 61 of the work clamp whereby the jaw thereof engages the upper surface of the work, the lower surface being engaged by the serrated plate 60 and in consequence of which the work is held in fixed position with respect to the backing-up bar.

The machine being now loaded and prepared to make the desired cut on the end of the moulding, it is necessary that the work carriage be moved upwardly past the rotary fixed pattern cutter. This is accomplished by the hydraulic mechanism heretofore described and in which the workman operating the machine presses his knee or a portion of his body against the valve operating button 32 to manipulate the rod 30, which manipulation closes the valve 23. In this position the pump 13 being operated by the motor 12 pumps fluid from the reservoir 15 through the pipe 17 and into the bottom of the hydraulic ram or lifter 18. When this is accomplished the ram moves upwardly and through the connecting rod 26 which is connected to the work carriage the work is consequently moved upwardly past the cutter during which of course the cutting operation is performed on the end of the moulding. After the moulding has been cut, the operator releases the pressure on the member 32 and through the action of the spring 34 the valve 23 is moved to its open position, and the springs 28 and 29 being connected to the crosshead 24 and under tension when the ram moves the rod 26 up, the valve 23 now being open, the pressure is released and the springs 28 and 29 retract the rod 26 and the work carriage and the fluid trapped in the ram 18 is permitted to return by way of the pipe 20 to the reservoir 15. After this has been accomplished the end of the moulding has been cut as desired and the clamp 61 is released and the moulding removed from the carrier, after which another piece of work is inserted and the operation continued in the manner set forth.

During the cutting operation it will be readily understood that the end of the work piece is very securely mounted against the pre-cut backing up bar and consequently during the cutting of the work piece the rotary pattern cutter moves in close parallel relation with the work piece and likewise through the pre-cut portion of the backing bar, and inasmuch as the backing up bar has been cut, the same provides a very accurate and desirable support for the work piece and consequently prevents chattering of the work piece and mainly prevents splintering of the wood piece along the lower edge of its cut, which would be the case were it not for the fact that the work piece is backed up by the backing up bar described. After considerable use the front edge of the backing up bar necessarily becomes worn and it is only necessary to loosen the bolts 57 and move the backing up bar 55 slightly forward and with the work not in place move the backing bar past the cutter to renew the contoured edge of the backing up bar. It has been found, however, that such a backing bar lasts for a considerable length of time in view of the fact that the same is made of relatively hard wood material and further due to the fact that the rotary pattern cutter contour does not actually engage the contoured front surface of the backing up bar 55.

Therefore, applicant has produced a machine for providing the ends of relatively long pieces of wood with contoured surfaces, which ends are free from fraying or splintering and are consequently in a very desirable condition when sold to the trade. In the particular embodiment of the invention, it is intended that the ends of the moulding be cut to an S shape and respective sections of the moulding can be joined at the respective S joints on the respective portions of the mouldings to thereby provide a very desirable connection which is almost imperceptible to the eye.

It, of course, will be understood that a multiple switch arrangement is provided, and is shown in the drawings at S for operating the electric motors which operate both the pump and the pattern cutter.

While the machine is shown as embodying means whereby the work holder is moved vertically past the cutter head, it will readily be apparent that instead, the work holder could be fixed and the motor and cutter head could be moved vertically past the fixed work. It will also be apparent that the backing-up bar 55 could be made of most any relatively hard material, other than wood, such as a hard plastic or fibre.

While the invention disclosed herein shows a preferred embodiment thereof, it will be understood that the same could be used as well for metal, more particularly a soft metal such as aluminum, and it is intended that the illustrated form of the invention is only intended to describe one use thereof and, of course, it will be understood that the same is capable of other uses within the scope of the following claims.

I claim:

1. A wood shaping machine comprising in combination a plurality of supporting legs, a supporting bed attached to the upper portion of said legs, a mounting platform attached to the lower portion of said legs, an electric motor and driven cutter mounted on the bed of the machine, a work holding device mounted adjacent the rotary cutter, and a guide plate along which the work holding device moves upwardly and downwardly, a backing-up bar fixedly mounted on said work holding device for supporting a work piece and positioned with respect to the cutter so that the end of the work piece will be contoured on movement of the work holding device past said cutter, a hydraulic control mechanism supported on said platform, including a reservoir, a pump and a hydraulic lift, a valve controlling the path of hydraulic fluid and operable by manual pressure, and spring means associated with a ram, said ram having a rod connection to the reciprocable work holding device, said ram being operated to move the work holding device upwardly and downwardly past the cutter when the valve is in one position to admit fluid to the ram, and said spring means associated with the ram returning the work carrier to its starting position upon the movement of the valve to its inoperative position as by release of pressure on the operating rod.

2. A machine for shaping the ends of elongated pieces of wood, comprising a pattern cutter rotatable about an axis, a work carrier, an elongated work supporting backing-up bar supported on said carrier and disposed transversely of said axis, said backing-up bar having a contoured end surface conforming with said cutter and disposed in the cutting path thereof, means for effecting relative movement of said cutter and said work carrier transversely of said axis with the cutting action of said cutter being opposed to said backing-up bar, and means for supporting an elongated wood piece on said backing-up bar with an end thereof projecting slightly beyond said contoured end surface for contour cutting action thereon by said cutter and with said wood piece being fully supported adjacent said cutting path.

3. The structure according to claim 2, wherein said work carrier comprises a plate on which said backing-up bar is supported for lengthwise adjustment thereof, whereby the contoured end after wear thereof is capable of being moved beyond the cutting path of the cutter for forming a new contoured end on the backing-up bar.

4. A machine for shaping the ends of elongated pieces of wood, comprising a horizontal bed, a bracket supported by said bed and being provided with vertical guide means, a work supporting head comprising a plate being vertically movable up and down by said guide means, means for moving said plate, a pattern cutter supported on said bed adjacent one edge of said plate and being rotatably supported on a horizontal axis normal to said plate, an elongated backing-up bar supported by said plate in longitudinal alignment with said cutter and having a contoured end conforming to the contour of said cutter and disposed in the cutting path of said cutter, and means for supporting an elongated wood piece on said backing-up bar with an end thereof projecting slightly beyond said contoured end of said backing-up bar for cutting action thereon by said cutter.

5. A shaping machine according to claim 4, wherein said backing-up bar is provided with a pair of longitudinally elongated transverse slots, and a bolt extended through each slot and threaded into said plate, said slots and bolts providing for longitudinal adjustment of said backing-up bar whereby the contoured end may be positioned in the path of said cutter for providing a new contoured surface when the prior contoured surface has become ineffectively worn.

6. A shaping machine according to claim 4, wherein spring means are provided for yieldably holding the forward end of the wood piece on said backing-up bar, and rigid means for precluding relative longitudinal movement of said backing-up bar and the wood piece.

References Cited in the file of this patent

UNITED STATES PATENTS

| | | |
|---|---|---|
| 538,130 | Sherman | Apr. 23, 1895 |
| 547,991 | Heald et al. | Oct. 15, 1895 |
| 999,623 | Altenstein | Aug. 1, 1911 |
| 1,091,773 | Sherman | Mar. 31, 1914 |
| 2,077,118 | Lewis | Apr. 13, 1937 |
| 2,253,354 | Svensson | Aug. 19, 1941 |
| 2,645,011 | Otis | July 14, 1953 |
| 2,704,093 | Brown | Mar. 15, 1955 |